United States Patent [19]

Sturm et al.

[11] Patent Number: 4,707,300
[45] Date of Patent: Nov. 17, 1987

[54] AUTOSYNERGISTIC PHENOLIC ANTIOXIDANT REACTION PRODUCT

[75] Inventors: Budd H. Sturm, Hartville; Joseph A. Kuczkowski, Monroe Falls, both of Ohio

[73] Assignee: The Goodyear Tire & Rubber Company, Akron, Ohio

[21] Appl. No.: 23,343

[22] Filed: Mar. 9, 1987

[51] Int. Cl.$^4$ .......................... C09K 15/14; C08K 5/13
[52] U.S. Cl. .................................... 252/404; 524/330; 524/331; 524/333
[58] Field of Search ....................... 524/330, 331, 333; 252/404

[56] References Cited

U.S. PATENT DOCUMENTS

| | | | |
|---|---|---|---|
| 2,322,376 | 6/1943 | McCleary et al. | 568/39 X |
| 2,417,118 | 3/1947 | McCleary et al. | 564/388 |
| 3,260,758 | 7/1966 | O'Shea et al. | 524/330 X |
| 3,346,648 | 10/1967 | Worrel | 524/331 X |
| 3,462,392 | 8/1969 | Kaplan | 524/343 X |
| 3,553,270 | 1/1971 | Wollensak et al. | 524/330 X |
| 3,903,173 | 9/1975 | Eggensperger et al. | 524/330 X |
| 4,304,940 | 12/1981 | Wedemeyer et al. | 568/45 |
| 4,358,616 | 11/1982 | Wedemeyer et al. | 568/45 |

FOREIGN PATENT DOCUMENTS 1150257 4/1985 U.S.S.R. ............................ 252/46.4

Primary Examiner—Matthew A. Thexton
Attorney, Agent, or Firm—D. O. Nickey

[57] ABSTRACT

This invention is concerned with the stabilization of oxidizable organic materials such as rubbers, oils, plastics and the like through the addition of an autosynergistic phenolic antioxidant reaction product to the oxidizable organic material. More specifically, this invention is directed to a definitive process for the preparation of an alkylated phenol/formaldehyde/mercaptan reaction product comprising the simultaneous acid catalyzed reaction of specific reactants at specific molar ratios under azeotroping conditions and the use of the reaction product in oxidizable organic materials.

17 Claims, No Drawings

AUTOSYNERGISTIC PHENOLIC ANTIOXIDANT REACTION PRODUCT

TECHNICAL FIELD

This invention relates to the discovery that the product of an acid catalyzed simultaneous reaction between a phenol, formaldehyde and a mercaptan at specific molar ratios, under very specific reaction conditions will result in a composition that is normally a liquid at room temperature, or a low melting solid, which exhibits excellent antidegradative properties, is autosynergistic and is easily incorporated into the oxidizable organic material.

BACKGROUND ART

Organic materials and especially polymers have proven to be difficult organic materials to stabilize against the deleterious affects of oxygen and ozone, particularly the unsaturated polymers, both natural and synthetic. Although many materials have been suggested and used as stabilizers in oxidizable organic materials, no completely satisfactory material has been found that will fully protect these materials under the widely different conditions to which they are subjected.

Phenolic compounds have been among the more commonly used compounds that have found wide scale acceptance as polymer stabilizers. However, many of the phenolic antioxidants, although reasonably effective stabilizers for organic materials, tend to impart discoloration and staining to the materials they are intended to stabilize and further have exhibited limited utility when used in compositions that are subjected to extreme oxidative or degradative conditions.

Further, some of the previously known phenolic antioxidants have limited solubility in certain materials. This insolubility has caused difficulties in the incorporation of the antioxidant and also results in the antioxidant's migration from the material to be protected.

Synergists have been used and developed over the years as a method for enhancing the ability of a phenolic compound to prevent the oxidative degradation of the organic material. The synergists are commonly sulfur containing compounds that enhance the ability of the antioxidant to protect the substrate from oxidative degradation.

There is presently a need in the industry for a low-cost material that will provide excellent protection to oxidizable organic materials yet be easily prepared from readily available and inexpensive raw materials. The instant invention provides a material that is both low in cost and easily prepared while also providing excellent stability to the materials in which it is incorporated.

U.S. Pat. No. 2,417,118 discloses a Mannich base catalyzed process for the preparation of a mono-nuclear phenolic motor fuel additive which comprises reacting an aromatic compound containing at least one hydroxyl radical with formaldehyde and an alkyl mercaptan. However, U.S. Pat. No. 2,417,118 does not suggest the use of an acid catalyst nor the use of an azeotroping solvent. Further, U.S. Pat. No. '118 does not suggest the molar ratios of the reactants which are disclosed and claimed in the instant application or the fact that the reaction product of the instant invention has outstanding properties for the stabilization of rubbers.

U.S. Pat. No. 3,260,758 discloses the base catalyzed preparation of 2,6 or 2,4 dialkyl 4 or 6 alkylthiomethyl phenols. U.S. Pat. No. '758 states that the process disclosed in U.S. Pat. No. 2,417,118 is plagued by long reaction times, the formation of color bodies and the side reaction product of methylene bis phenols. U.S. Pat. No. '758 produces a singular mono-nuclear phenolic product through the use of a 2,4 or 2,6 disubstituted alkyl phenolic starting material. U.S. Pat. No. '758 also uses only strong bases as catalysts for the reaction, and does not suggest or limit molar ratios of reactants nor does it suggest that toluene should be used as an azeotroping solvent.

U.S. Pat. No. 3,462,392 deals with the stabilization of polyolefins using a specific combination of dinonylphenol and methylene bis-dinonylphenol as a stabilizer. This patent suggests the preparation of the bis compound through an acid catalyzed reaction of formaldehyde with a 2,4 disubstituted phenol.

U.S. Pat. No. 3,553,270 describes the reaction of phenols unsubstituted in at least one position ortho or para to the hydroxyl group with formaldehyde and mono or dimercaptans to yield $\alpha$-(hydro-carbylthio)-cresols or $\alpha,\alpha$-alkylene dithiobis compounds. This patent mentions the method of U.S. Pat. Nos. 2,322,376 and 2,417,118 and states that the direct reaction between a phenol, formaldehyde and a mercaptan is operable on 2,6 dialkylphenols only with an alkaline catalyst and that it tends to give colored products and, especially with the less hindered 2,6 dialkylphenols is complicated by a side reaction leading to a methylenebisphenol. The process of U.S. Pat. No. 3,553,270 for preparing $\alpha$-(hydro-carbylthio)-cresols avoids the problems of methylene bis phenols production through the use of a 2,6 or 2,4 disubstituted phenols as starting materials. The U.S. Pat. No. '270 patent does not suggest and even teaches away from the instant discovery that use of alkylated phenols in an acid catalyzed reaction with formaldehyde and a mercaptan under azeotroping conditions will produce highly effective stabilizers for oxidizable organic materials.

U.S. Pat. No. 4,358,616 claims a process for the preparation of alkylthiomethylphenols which avoids resin production through reacting hydroxymethyl phenols with a mercaptan in the absence of a catalyst. This patent does not realize that a highly effective antioxidant reaction product can be prepared through the simultaneous reaction of an alkylated phenol, formaldehyde and a primary or secondary mercaptan in the presence of an acid catalyst.

U.S. Pat. No. 3,903,173 discloses a process for the preparation of mono and dimethylene thioethers of dialkyl phenols wherein dialkyl phenols are reacted with formaldehyde and a mercaptan compound in an inert solvent in the presence of an alkaline compound such as sodium or potassium hydroxide. In a like manner, U.S. Pat. No. 4,304,904 uses at least one compound of lithium, magnesium, cobalt, nickel, copper, iron, chromium and aluminum as a catalyst to avoid the production of isomers, homologues and resins. These references fail to appreciate that under very critical reaction conditions, a highly desirable reaction product can be obtained that possesses excellent antioxidant properties.

Soviet Union Patent No. 1,150,257 discloses a lubricating/cooling liquid for metal processing which contains in weight percent, 1–3% chlorinated paraffin, 2–4% barium sulfonate, 2–3% dodecyl-thiomethyl-nonylphenol as a sulfur containing additive and mineral oil. The dodecyl-thiomethyl-nonylphenol is obtained by reacting dodecyl-mercaptan with formaldehyde and alkylphenol in benzene solution without a catalyst. The Soviet patent states that tests show the lubricating/cooling composition has improved lubricating properties, increased efficiency of metal working by 1.22 times, and wear resistance of cutting tools by 2.1 times, and reduced roughness of treated surface by 1.5 times. This reference does not suggest that an acid catalyzed reaction product would be useful as an antidegradant for oxidizable organic materials.

The search for new and better polymer and organic material stabilizers continues to command the attention of many skilled investigators; however, the prior art and literature on the subject does not disclose nor suggest that the acid catalyzed reaction of a phenol with formaldehyde and a mercaptan will result in a reaction product that is autosynergistic and which imparts outstanding oxidative resistance to the material into which it is incorporated. The novel reaction product of this invention and its process of preparation form the basis of the instant invention. The composition or mixture which results from the reaction disclosed herein is a superior stabilizer that overcomes some of the prior art problems of volatility, stabilizer extraction and the necessity of high levels of incorporation.

DISCLOSURE OF THE INVENTION

There is disclosed a stabilized organic composition comprising an oxidizable material and a stabilizing amount of an autosynergistic phenolic antioxidant reaction product, said autosynergistic phenolic antioxidant reaction product is derived from the process comprising:

(1) admixing one mole of a mono-alkylated phenol or a 2,4-dialkylated phenol or a mixture thereof, wherein the alkyl radical may be straight or branched and may contain from 1 to 20 carbon atoms; with
  (a) from 0.5 to 1.5 moles of a primary mercaptan of 3 to 20 carbon atoms; and
  (b) from 0 to 50% molar excess of aqueous formaldehyde based on moles of primary mercaptan when the molar ratio of mercaptan to phenol is 1.0 or greater or 0 to 100% excess of aqueous formaldehyde when the ratio of mercaptan to phenol is less than 1.0; and
  (c) from 0.04 to 20 percent by weight based on the weight of alkylated phenol of an acid catalyst; and
  (d) an adequate amount of an azeotroping solvent;

(2) heating the admixture from ambient up to 180° C. while azeotropically removing water until the production of the waters of reaction ceases; and (3) neutralize the catalyst and isolate the products.

There is also disclosed a novel composition of matter, said composition of matter being derived from the process described above for the preparation of the autosynergistic phenolic antioxidant reaction product.

There is further disclosed an antioxidant for the protection of organic materials, said antidegradant being a mixture of reaction products derived from the process comprising:

(1) admixing one mole of an alkylated phenol selected from the group consisting of p-cresol, m-cresol, o-cresol, 2,4-dimethylphenol, 2-t-butyl-p-cresol, p-ethylphenol, 3-ethylphenol, p-monononylphenol, p-isopropylphenol, p-sec-butylphenol, o-sec-butylphenol, p-t-butylphenol, 3-t-butylphenol, p-t-octylphenol, 2,4-dinonylphenol, and dodecylphenol; with (a) from 0.5 to 1.5 moles of a primary mercaptan of 6 to 14 carbon atoms; and
  (b) from 0.5 to 2.25 moles of aqueous formaldehyde; and
  (c) from 0.1 to 10 percent by weight based on the weight of the alkylated phenol of an acid selected from the group consisting of toluene sulfonic acid, methanesulfonic acid, xylenesulfonic acid, sulfuric acid, glacial acetic acid, boron trifluoride, and Amberlyst 15; and
  (d) an adequate amount of a solvent that will azeotrope with water;

(2) heating the admixture from ambient to 150° C. while azeotropically removing water until the production of the waters of reaction ceases;

(3) neutralization of the acid and isolation of the reaction product mixture.

Representative of the organic materials that can benefit through the use of the reaction product of the instant invention include those materials that are susceptible to the oxidative degradation. Such materials include oils, fats, plastics and the like. More specifically, this invention relates to the stabilization of polymeric materials that are subject to oxidative degradation. The polymers or rubbers that may be conveniently protected by the reaction product described herein are vulcanized and unvulcanized polymers which are susceptible to oxidative degradation such as natural rubber, and synthetic polymers including those containing carbon to carbon double bonds such as rubbery diene polymers both conjugated and non-conjugated. Representative examples of the synthetic polymers that will benefit through the use of this invention are polychloroprene and homopolymers of conjugated 1,3-dienes such as isoprene and butadiene. Copolymers of conjugated 1,3-dienes such as isoprene and butadiene with up to 50 percent by weight of at least one copolymerizable monomer including ethylenically unsaturated monomers such as styrene and acrylonitrile are included. Butyl rubbers and polyurethanes which contain carbon to carbon double bonds can also benefit from the instant invention. In general, any organic material that is subject to oxidative degradation will benefit from the incorporation of the reaction product of this invention.

The autosynergistic phenolic antioxidant reaction product of this invention may be used with or without other stabilizers, vulcanizing agents, synergists, accelerators or other compounding ingredients. In order to effectively stabilize the organic material, small proportions of the reaction product in accordance with this invention are added to the oxidizable organic material in a fashion customary to the industry. The amount of the reaction product may vary somewhat depending on the type and requirements of the material to be protected and the conditions to which the substrate will be subjected.

The method of addition of the autosynergistic phenolic antioxidant reaction product to the material to be stabilized is not critical. It may be added by any of the conventional means such as by adding to a polymer latex, milling on an open mill or by internal mixing. When the stabilizer of this invention is used to stabilize rubbers such as styrene/butadiene rubber or polybutadiene, a convenient method of incorporation consists of adding the stabilizer to the polymer while it is in latex or cement forms. This is preferably done after the polymerization of the monomers is essentially complete.

Normally from about 0.001 part to about 5.0 parts of the autosynergistic phenolic antioxidant reaction product by weight based on the weight of the polymer can be used; however, the precise amount of the reaction product to be employed will depend on the nature of the polymer or oxidizable organic material and the severity of the deteriorating conditions to which the material is to be exposed. It has been found that an effective antioxidant amount of the disclosed reaction product in polymers will generally range from about 0.05 part to about 5.0 parts by weight or higher based on 100 parts by weight of the polymer although it is commonly preferred to use from about 0.25 part to about 2.0 parts by weight based on 100 parts by weight of the polymer. The above limits are merely guidelines and those skilled in this art will readily appreciate the proper amount of the reaction product that will be required to impart a stabilizing affect to the substrate.

Representative of the phenolic starting materials useful in preparing the reaction product of this invention are compounds such as monobutylated phenol, 2,4-dibutylated phenol, nonylphenol, 2,4-dinonylphenol, dodecylphenol, mono and 2,4-dimethyl phenols, and the like. Other phenolic compounds such as styrenated phenol and alpha-methylstyrenated phenol are contemplated herein. It should be appreciated that the starting phenolic compound may be mono or 2,4-dialkylated and mono or 2,4-distyrenated. Further it should be appreciated that the alkyl substitute may range from 1 to 30 carbon atoms while an arylalkyl substituent will range from 8 to 9 carbon atoms. Preferably the alkyl substituent will contain from 1–12 carbon atoms.

The reaction must be conducted with an azeotroping solvent such as toluene, xylene or benzene or the reaction will not produce the product of this invention.

The formaldehyde used in preparing the reaction product of this invention is aqueous formaldehyde which may contain from 10 to 50 percent formaldehyde by weight of the aqueous solution. It has been found that the use of paraformaldehyde is not useful since the material has a tendency to sublime and then solidify in the reaction system. Preferably, the formaldehyde used in the instant process is a formaldehyde solution which contains about 35–45 percent formaldehyde by weight.

The normal mercaptans useful in the instant invention include those primary mercaptans of from 3 to 20 carbon atoms. In addition, crude mixtures of mercaptans from 3 to 20 carbon atoms can be effectively utilized. The use of secondary and tertiary mercaptans are not contemplated herein as they do not provide the desired reaction product. Representative of the primary mercaptans useful in preparing the reaction product of this invention include dodecylmercaptan, octylmercaptan, butylmercaptan, hexylmercaptan, and the like.

Representative of the acid catalysts useful in preparing the reaction product of this invention include benzene sulfonic acid, toluene sulfonic acid, xylene sulfonic acid, methane sulfonic acid, methane disulfonic acid, longer chain alkyl sulfonic acids, boron trifluoride, solid resin or polymers that contain sulfonic acid groups such as Amberlyst 15, sulfuric acid and the like. The amount of acid added to the reaction mixture to catalyze the reaction will range from 0.04 to 20 percent by weight based on the weight of the phenolic compound.

The temperature utilized to prepare the reaction product of this invention can be from room temperature up to about 180° C. Preferably, after the combination of the reactants, (phenol, formaldehyde, mercaptan and acid) the mixture is stirred while a mild exotherm results. After the exotherm ceases, the reaction mixture is gradually elevated to a temperature of up to 180° C. while the water of reaction and the water of solution (from the aqueous formaldehyde) is removed.

An important aspect of this invention relates to the molar ratios of the reactants employed. As will be demonstrated infra, ratios outside of those claimed will result in a product that is inferior.

Representative of the caustic materials which may be used to neutralize the reaction mixture after water production has ceased (indicating completion of the reaction) include sodium hydroxide, potassium hydroxide, sodium carbonate, sodium bicarbonate, and the like. One skilled in the art of chemistry will readily appreciate that the reaction mixture should be cooled to below 100° C. prior to the neutralization of the reaction mixture with caustic. The amount of caustic added should be at least sufficient to neutralize the acid catalyst.

After the reaction is complete and the product has been isolated, the autosynergistic phenolic antioxidant reaction product may be used as is.

Depending upon the reactants utilized, the reaction product may be either a liquid at room temperature or a low melting point solid.

One aspect of the instant invention is concerned with the criticality of the molar ratios of the reactants. Based on moles of the alkylated phenol from 0.5 to 1.5 moles of the mercaptan have been found suitable; more preferred is a ratio of from 0.75 to 1.25 moles of mercaptan per mole of the phenolic compound. The most preferred molar ratio is 1 to 1. If molar ratios outside the ranges disclosed and claimed are used, the antidegradative properties of the reaction product decrease or the reaction product itself becomes highly viscous and difficult to handle.

The amount of formaldehyde utilized is generally equal to or in excess of the moles of mercaptan. It has been found that from 0 to 50% molar excess of formaldehyde based on moles of mercaptan is useful when the molar ratio of mercaptan to phenol is 1.0 or greater or 0–100% excess of formaldehyde when the ratio of mercaptan to phenol is less than 1.0 will provide an outstanding product.

The order of addition of the reactants is important. It has been found beneficial to add the phenolic compound, the mercaptan, azeotroping solvent and catalyst to the reaction vessel and begin stirring prior to the addition of the aqueous formaldehyde. One skilled in the art of chemistry will realize that the resultant reaction product is not an identifiable single chemical entity but rather a mixture of compounds. Without limitation, it is believed that the reaction product from the acid catalyzed azeotropic condensation reaction of 1 mole of p-nonylphenol, 1 mole of dodecylmercaptan and 1 mole of formaldehyde includes compounds of the following structural formulae:

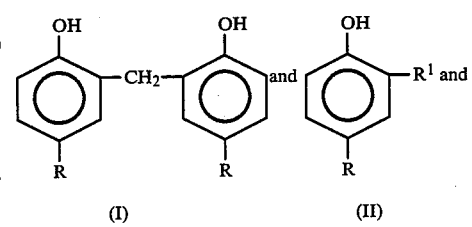

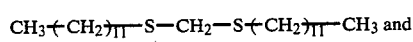

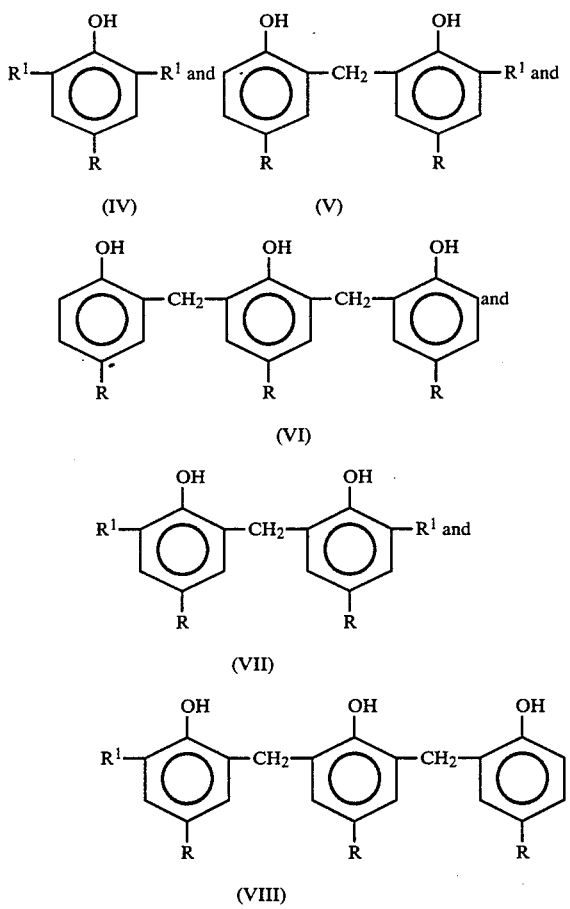

wherein R is a nonyl radical and $R^1$ is the radical —CH$_2$—S—(CH$_2$)$_{11}$—CH$_3$.

It is believed that the reaction product contains compounds I-VIII and some higher homologues and similar minor condensation products based on the phenolic material and some residual starting materials. Unlike the prior art methodologies, it has been discovered that with proper reaction conditions and reactant ratios, a product will result that is not a single chemical entity but rather a mixture that possesses excellent stabilization properties. This invention is not to any one particular chemical species but rather to the product derived from the process recited herein. It has been discovered that through the use of proper molar ratios of reactants, catalyst concentrations and azeotroping conditions, that a reaction product mixture will result which demonstrates excellent antioxidative activity.

BEST MODE

The autosynergistic phenolic antioxidant reaction products disclosed herein were prepared in a three neck one liter reaction flask fitted with a stirrer, a Clasien adaptor with a Dean Stark trap, a thermometer, a water condenser and a dropping funnel. Heat to the reaction flask was provided through a heating mantel. The water from the aqueous formaldehyde solution and the water of reaction was collected in the Dean Stark trap as an azeotrope. The azeotroping solvent for the reaction, such as toluene, was returned to the reaction flask after separation from the water. All reactions were conducted until production of the water of reaction had ceased. Thereafter the reaction product was cooled to below 100° C. and aqueous caustic solution, such as NaOH, was added in minor excess. The mixture was stirred until the neutralization was complete; the water was separated through a phase separation; and then the reaction product was stripped at 125° to 190° C. pot temperature at 10 to 25 millimeters of mercury pressure. The resulting product was then filtered to remove the salts of neutralization. The resulting product was a liquid or a material that slowly crystallizes upon standing or a very low melting point solid. As stated above, the reaction product is characterized as a mixture of compounds with various molecular weights.

The products produced in the following examples according to the invention and the comparatives were evaluated in a number of polymers by oxygen absorption at 100° C. The data is summarized in the tables. The testing procedure is described in further detail in Industrial and Engineering Chemistry 43, page 456 (1951) and Industrial and Engineering Chemistry, 45, page 392 (1953).

EXPERIMENTAL - 1–12

Level of Mercaptan

To a three neck one liter reaction vessel fitted with a stirrer, a Clasien adaptor with a Dean Stark trap, a thermometer, a water condenser and a dropping funnel was charged 1.0 mole or 220 grams of 95% p-monononylphenol, 8.0 grams of toluenesulfonic acid, the designated amount of 98% n-dodecylmercaptan and 125 grams of toluene. The mixture was stirred at room temperature followed by rapid addition of the indicated amount of 37% aqueous formaldehyde. Stirring continued for two hours while the mixture exothermed and thereafter the mixture was heated to 135°-142° C. while removing the H$_2$O/toluene azeotrope. The azeotrope was separated in the Dean Stark trap and the toluene was returned to the reaction. Heating was continued until production of the water of reaction had ceased which was approximately 2 to 2½ hours. The reaction was cooled to 95° C. and neutralized with 9 grams of sodium carbonate in 75 grams of water. The mixture was stirred for ½ hour at 80° to 95° C. thereafter the water layer was removed. The reaction product was azeotrope dried and salts of neutralization were filtered and the product (filtrate) was stripped to 165° to 175° C. pot at 10–20 mm of Hg pressure. The yield of product based on charged materials, less water of reaction, was usually 100%.

The product was used as is after stripping and was submitted to GPC analysis. A 100 ml toluene solution of 1 gram of the product was made. A toluene solution of the polymer to be tested in the oxygen absorption test was made and combined with the solution of the reaction product so that 1% by weight of the reaction product was present in the cast film. The dried film was then placed in an oxygen absorption device and exposed to oxygen at 100° C.

Table I sets out amount of dodecylmercaptan used, the amount of formaldehyde and the hours to absorb 1% O$_2$ by weight for each sample.

TABLE I

Influence of various levels of dodecylmercaptan on the antioxidative properties of the autosynergistic phenolic reaction product in the stabilization of styrene/butadiene rubber.*

| Example | Moles of Formaldehyde as a 37% Aqueous Solution | Moles of Dodecyl Mercaptan | Hours to 1% O₂ by Weight (100° C.) |
|---|---|---|---|
| 1+ | 1.0 | 0.125 | 282 |
| 2+ | 1.0 | 0.25 | 437 |
| 3 | 1.0 | 0.50 | 828 |
| 4 | 1.0 | 0.75 | 1017 |
| 5 | 1.25** | 1.0 | 962 |
| 6 | 1.56 | 1.25 | 811 |
| 7 | 1.88 | 1.5 | 835 |
| 8+ | 2.19 | 1.75 | 725 |
| 9+ | 2.50 | 2.0 | 704 |
| 10+ | 2.81 | 2.25 | 675 |
| 11+ | 3.13 | 2.5 | 688 |
| 12+ | 3.44 | 2.75 | 617 |
| 13+ | 3.75 | 3.0 | 359 |

*Styrene/butadiene rubber marketed by The Goodyear Tire & Rubber Company as Plioflex ® 1712C having 23½% bound styrene by weight. Antioxidant level of 1.0 parts per 100 parts of rubber by weight.
**For levels of mercaptan greater than or equal to 1.0 mole, a 25% molar excess of formaldehyde to the mercaptan was used to assure the consumption of the mercaptan.
+Outside the scope of the invention.

In comparison, the commercially available antioxidant Wingstay ® C which is butylated di(dimethylbenzyl) phenol afforded only 275 hours of protection to the SBR at the 1.0 part level per 100 parts of rubber.

It is a most interesting discovery that the level of mercaptan from 0.5 to 1.5 moles per mole of alkylated phenol provided the best antioxidative properties. Mole ratios outside of the 0.5 to 1.5 level for the mercaptan are inferior and it is believed such ratios outside of the 0.5 to 1.5 level result in a product that promotes autooxidation of the rubber and as such is undesirable.

EXPERIMENTAL 14-30

Relationship of the Alkylated Phenol to the Antioxidative Properties of the Reaction Product The following experiments were conducted using the previously described apparatus and procedure except that 1.0 moles of a designated phenol was reacted with 1.0 mole of dodecylmercaptan and 1.25 mole of formaldehyde using xylenesulfonic acid as the catalyst. The level of catalyst was adjusted in Experiments 15, 20, and 25 to prevent condensation polymerization of the phenol with the formaldehyde.

Table II sets forth the alkylated phenols used (within and outside the scope of the invention) and the hours to adsorb 1% O₂ by weight in the SBR described previously.

TABLE II

Influence of various alkyl substituents on the antioxidative properties of the reaction product.

| Example | Alkylated Phenol | Hours to Absorb 1%* O₂ by Weight-100° C. |
|---|---|---|
| 14 | p-cresol | 925 |
| 15 | m-cresol | 1130 |
| 16 | o-cresol | 1145 |
| 17 | 2,4-dimethylphenol | 1175 |
| 18 | 2-t-butylphenol | 925 |
| 19 | p-ethylphenol | 865 |
| 20 | 3-ethylphenol | 725 |
| 21 | p-isopropylphenol | 905 |
| 22 | p-sec-butylphenol | 840 |
| 23 | o-sec-butylphenol | 1075 |
| 24 | p-t-butylphenol | 970 |
| 25 | 3-t-butylphenol | 985 |
| 26+ | 3,5-di-t-butylphenol | 185 |
| 27+ | 2,6-di-t-butylphenol | 565 |
| 28 | p-t-octylphenol | 880 |
| 29 | 2,4-dinonylphenol | 1120 |
| 30 | p-dodecylphenol | 1085 |

*Reaction product at 1 part per 100 parts of SBR.
+Alkylated phenols outside the scope of this invention - the reaction product obtained using these phenols resulted in rubbers after oxidation that were highly colored and brittle.

In comparison unprotected SBR absorbs 1% O₂ in about 4 hours while the commercially available antioxidant Wingstay ® S (a styrenated phenol available from The Goodyear Tire & Rubber Company) at the 1.0 part level afforded 125 hours of protection and at the 0.5 part level, 120 hours.

It is interesting to note that the 3,5 and 2,6 dialkylated phenols, outside the scope of this invention, were vastly inferior to the other alkylated phenols investigated.

EXPERIMENTAL 31-33

Use of Different Acid Catalysts

The following experiments were conducted using the apparatus and procedure of Experimental 1 except that 1.1 moles of formaldehyde, 1.0 moles of normal dodecylmercaptan and 1.0 moles of 95% p-mononylphenol were reacted using different acid catalysts. Table III sets out the catalyst used and the amount and hours to absorb 1% O₂ by weight for the SBR previously described.

TABLE III

Use of Different Acid Catalysts

| Example | Acid Catalyst Used | Amount of Catalyst | Hours to 1% O₂ |
|---|---|---|---|
| 31 | Toluenesulfonic | 12 g | 900 |
| 32 | Methanesulfonic | 12 g | 710 |
| 33 | Xylenesulfonic | 12 g | 910 |

Other catalysts used to prepare the reaction product of this invention include $H_2SO_4$, $BF_3$ etherate, glacial acetic acid and Amberlyst 15. It appears that a wide variety of acids would be useful in the process described.

GPC analysis of the reaction products obtained from Experimentals 31-33 revealed the following molecular weight distributions:

| GPC Analysis Approximate Mol. Weight in THF | Ex 31 (TSA) % Area | Ex 32 (MSA) % Area | Ex 33 (XSA) % Area |
|---|---|---|---|
| 1800–1200 | 29.8 | 43.8+ | 29.6 |
| 950 | 33.6 | 21.1 | 32.4 |
| 650 | 26.0 | 9.0 | 26.2 |
| 500 | — | 1.9 | — |
| 350* | 1.3 | 0.7 | 1.6 |
| 300** | 9.5 | 23.6 | 10.2 |

*Apparent molecular weight of p-mononylphenol in THF.
**Apparent molecular weight of n-dodecylmercaptan in THF.
+2500–1200 molecular weight.

It appears that Example 32 using methanesulfonic acid produced a product having a higher molecular weight component while failing to react a substantial portion of the mercaptan. Toluenesulfonic acid and xylenesulfonic acid appears to be essentially equivalent in catalyzing the reaction.

EXPERIMENTALS 34 & 35

Comparison of Acid vs. Base Catalyzed Reaction

Several patents disclose the use of bases to catalyze the reaction between a phenol, formaldehyde, and a mercaptan. For example U.S. Pat. No. 4,304,940 describes the reaction between a substituted phenol, formaldehyde and a mercaptan at 90°-220° C. in the presence of a compound such as zinc acetate, KOH, LiOH, ZnO and so on. U.S. Pat. No. 3,346,648 discloses a process for the preparation of compounds such as bis(3,5-di-tert-butyl-4-hydroxybenzylthio)ethane through the reaction of 1,2-di-mercaptoethane, formaldehyde and 2,5-di-tert-butylphenol in the presence of magnesium hydroxide. U.S. Pat. No. 3,553,270 claims the reaction of a 2,6 or 2,4 dialkyl phenol with formaldehyde and a mercaptan in the presence of a base catalyst. What these references and others have failed to realize, in addition to the molar ratios and use of an azeotroping solvent, is that an acid catalyst will provide a reaction product that is a mixture of components which in the proportions produced, possess superior antioxidative properties.

To demonstrate that base catalyzed reactions produce a different reaction product, the apparatus and procedure of Example 1 was used except that 1.25 moles of formaldehyde and 1.0 moles of n-dodecylmercaptan was reacted with p-monononylphenol in the presence of 8.0 grams of toluenesulfonic acid. In Example 35 the same reactants were used except TSA was replaced with NaOH and a two step condensation procedure was used. In the base catalyzed reaction, the alkyl phenol is first reacted with NaOH to produce the phenolate. The phenolate was then combined with formaldehyde at 25°-45° C. with stirring for 2-5 hours. This reaction mixture was then treated with 1 mole of 50% $H_2SO_4$ at about 45° C. to yield the free phenols and products of neutralization. After separation, toluene as the azeotroping solvent, TSA and the mercaptan were added and the reaction and work up were conducted as previously described.

GPC analysis of the reaction products revealed the following molecular weight distributions:

| Apparent Molecular Weight in THF | Example 34 Acid Catalyzed | Example 35 Base Catalyzed |
|---|---|---|
| Above 1600 | — | — |
| 1600-1230 | 25.8 | — |
| 1230 | — | 3.6 |
| 950 | 31.9 | 47.2 |
| 650 | 30.9 | 36.1 |
| 350 | 1.8 | 8.6 |
| 300 | 9.7 | 4.5 |

As the GPC data reveals, the product distribution from the acid catalyzed route is substantially different from that of the base catalyzed reaction. In addition, the product obtained with the acid catalyst was much lighter in color than the base product. The base route has several disadvantages such as: (1) the base (NaOH or KOH) must be used on an equal molar basis with the alkylphenol: (2) slightly more than equal molar amounts of acid ($H_2SO_4$) are required to neutralize the Na or K phenolate; (3) waste water streams are loaded with inorganic salts after neutralization; and (4) the base reaction is at least a two-step procedure. In contrast, the acid route uses only catalytic amounts of acid, is a one-step process, no second neutralization is required, vastly reduced amounts of salts are found in the waste water, shorter reaction times are realized and virtually 100% yields are consistently produced.

EXPERIMENTALS 36-39

To further demonstrate that the base catalyzed reaction produces an inferior antioxidant, Examples 2-5 were duplicated except that the base catalyzed reaction was used. Table IV sets out the molar ratio of reactants and hours to absorb 1% $O_2$ in SBR.

TABLE IV

Influence of Acid and Base Catalysts on the Antioxidative Effectivness of the Reaction Product in SBR

| Example | Acid/Base | Moles p-mnp*** | Moles $CH_2O$ | Moles n-Dodecyl Mercaptan | **Hours to 1% $O_2$ |
|---|---|---|---|---|---|
| 2+ | Acid | 1.0 | 1.0 | 0.25 | 437 |
| 36+ | Base | 1.0 | 1.0 | 0.25 | 355 |
| 3 | Acid | 1.0 | 1.0 | 0.5 | 828 |
| 37+ | Base | 1.0 | 1.0 | 0.5 | 650 |
| 4 | Acid | 1.0 | 1.0 | 0.75 | 1017 |
| 38+ | Base | 1.0 | 1.0 | 0.75 | 750 |
| 5 | Acid | 1.0 | 1.0 | 1.0 | 962 |
| 39+ | Base | 1.0 | 1.0 | 1.0 | 925 |

+Outside the scope of this invention.
**Oxygen absorption of SBR as previously described.
***p-mnp is p-monononylphenol.

The results shown in Table IV are surprising since one skilled in the art would believe from the literature that the base and acid catalyzed reaction products should be almost equivalent; however, the data supports the position that the base catalyzed reaction products are inferior to the acid catalyzed reaction product in the stabilization of the organic substrate. In addition, the reaction product of the base catalyzed process was much darker in color.

EXPERIMENTALS 40-42

Influence of Mercaptan

The procedure and apparatus of Example 1 was used except 1.0 mole of 95% p-monononylphenol was reacted with 1.25 mole of formaldehyde, and 1.0 mole of the designated mercaptan in the presence of 8 g of xylenesulfonic acid. Table V sets out the mercaptan used and the hours to absorb 1% $O_2$ by weight.

TABLE V

Influence of Mercaptan on the Antioxidative Effectiveness of the Reaction Product

| Example | Mercaptan | *Hours to 1% $O_2$ by Weight |
|---|---|---|
| 40 | $CH_3-(CH_2)_{11}-SH$ | 925 |
| 41 | $CH_3-(CH_2)_7-SH$ | 960 |
| 42 | $CH_3-(CH_2)_3-SH$ | 970 |

*Tested in SBR as previously described.

It appears that the type of mercaptan does not affect the antioxidative properties as much as the molar ratio of the mercaptan to the other reactants.

In general the typical physical properties of the complex mixture obtained in accordance with the process of this invention include a molecular weight range of from about 650 to greater than 1250 with a molecular weight average of approximately 850. The specific gravity of the product is around 0.94 with a Gardner color of about 4. The viscosity of the product of this invention at 25° C. is from 500 to 600 centipoise and has a flash point (PMCC) of about 154° C.

Table VI compares the effectiveness of the antioxidant obtained from Example 5, with several commercially available antioxidants in SBR.

TABLE VI

Product from Example 5 vs. Commercially Available Antioxidants

| Stabilizer | (PHR) | Hours to 1 Weight % $O_2$ Absorbed** |
|---|---|---|
| Example 5 | (0.5) | 545 |
| Example 5 | (1.0) | 962 |
| Wingstay C+ | (1.0) | 250 |
| Wingstay S+ | (1.0) | 120 |
| Wingstay T+ | (1.0) | 350 |
| Wingstay 29+ | (1.0) | 495 |
| TNPP** | (1.0) | 40 |

*23.5% bound styrene, cold polymerized SBR.
**TNPP is tris-nonylphenylphosphite.
+Antioxidants available from The Goodyear Tire & Rubber Company. Wingstay ® C is butylated di(dimethylbenzyl)phenol; Wingstay ® S is styrenated phenol; Wingstay ® T is butylated octylated phenols; Wingstay ® 29 is p-oriented styrenated diphenylamines.

Other properties of the reaction product of this invention were compared to accepted rubber chemicals. In accelerated aging (70° C.) of oil-extended SBR (23.5% bound styrene containing 37.5 parts of naphthenic oil and 1.25 PHR stabilizer), the polymer's Mooney viscosity was unchanged after 35 days using the product from Example 5, while the polymer with a conventional antioxidant (Wingstay ®-C) showed a 38 Mooney drop after only seven days. In testing of the same polymer, a 2.5 percent gel increase was noted with the product from Example 5 after 28 days, while a 37 percent gel increase occurred using Wingstay ®-C.

In acrylonitrile/butadiene rubber (33% ACN, cold polymerized NBR containing 1.5 PHR stabilizer), the product from Example 5 exhibited a 5 unit Mooney viscosity increase after 35 days of accelerated aging (70° C.). Conventional systems produced an increase of 40 (alkylated monophenol) to 53 (substituted diphenylamine) viscosity units in the same period.

Oil extended SBR (23.5% bound styrene containing 37.5 parts naphthenic oil) was tested and it was determined that 0.2 PHR of the reaction product from Example 5 provided greater stability than 1.25 PHR of the conventional stabilizer, Wingstay ®-C. Using the reaction product from Example 5, the reduction in viscosity was only 15 points in 14 days, while the conventional stabilizer produced a 31 point decrease in Mooney viscosity.

INDUSTRIAL APPLICABILITY

The results from the oxygen absorption tests conducted herein amply demonstrate that the reaction product of the instant invention is highly desirable in the stabilization of oxidizable organic materials. The instant invention provides a reaction product that is low in cost, easy to manufacture without attendant pollution problems and provides unexpectedly superior antidegradative protection. The autosynergistic phenolic antioxidant reaction product of this invention will have utility in industry since it is low in cost, has a low volatility, is Mooney stabilizing, is a hydrogen radical donor, acts as a peroxide decomposer, is an alkyl radical trap and persists in polymers under severe conditions.

While certain representative embodiments and details have been shown for the purpose of illustrating the invention, it will be apparent to those skilled in the art that various changes and modifications may be made therein without departing from the scope of the invention.

What is claimed is:

1. A stabilized organic composition comprising an oxidizable material and a stabilizing amount of an autosynergistic phenolic antioxidant reaction product, said autosynergistic phenolic antioxidant reaction product is derived from the process comprising:
    (1) admixing one mole of a mono-alkylated phenol or a 2,4-dialkylated phenol or a mixture thereof, wherein the alkyl radical may be straight or branched and ranged from 1 to 20 carbon atoms; with
        (a) from 0.5 to 1.5 moles of a primary mercaptan of 3–20 carbon atoms; and
        (b) from equal molar amount up to 50% molar excess of aqueous formaldehyde based on moles of primary mercaptan when the molar ratio of mercaptan to phenol is 1.0 or greater or equal molar amount up to 100% excess of aqueous formaldehyde when the ratio of mercaptan to phenol is less than 1.0; and
        (c) from 0.04 to 20 percent by weight based on the weight of alkylated phenol of an acid catalyst; and
        (d) an adequate amount of an azeotroping solvent;
    (2) heating the admixture from ambient up to 180° C. while azeotropically removing water until the production of the waters of reaction ceases; and
    (3) neutralize the catalyst and isolate the products.

2. A stabilized organic composition according to claim 1 wherein said acid catalyst is selected from the group comprising: toluene sulfonic acid, xylene sulfonic acid, methane sulfonic acid, dimethyl sulfonic acid, boron trifluoride, Amberlyst 15 ® and sulfuric acid.

3. A stabilized organic composition according to claim 1 wherein the monoalkylated phenol is selected from the group consisting of m-cresol, o-cresol, p-cresol, 2-t-butylphenol, p-isopropylphenol, o-sec-butylphenol, p-t-butylphenol, p-dodecylphenol and p-nonylphenol.

4. A stabilized organic composition according to claim 1 wherein the 2,4-dialkylated phenol is selected from 2,4-dimethylphenol and 2,4-dinonylphenol.

5. A stabilized organic composition according to claim 1 wherein the primary mercaptan is selected from n-dodecylmercaptan, n-octylmercaptan and n-butylmercaptan.

6. A stabilized organic composition according to claim 1 wherein the mole ratio of phenolic to formaldehyde to mercaptan is 1:1.25:1.

7. A stabilized organic composition according to claim 1 wherein the azeotroping solvent is selected from toluene xylene or benzene.

8. A novel composition of matter prepared according to a process which comprises:
    (1) admixing one mole of a mono-alkylated phenol or a 2,4-dialkylated phenol or a mixture thereof, wherein the alkyl radical may be straight or branched and ranged from 1 to 20 carbon atoms: with
(a) from 0.5 to 1.5 moles of a primary mercaptan of 3-20 carbon atoms; and
(b) from equal molar amount of to 50% molar excess of aqueous formaldehyde based on moles of primary mercaptan when the molar ratio of mercaptan to phenol is 1.0 or greater or equal molar amount of up to 100% excess of aqueous formaldehyde when the ratio of mercaptan to phenol is less than 1.0; and
(c) from 0.04 to 20 percent by weight based on the weight of alkylated phenol of an acid catalyst; and
(d) an adequate amount of an azeotroping solvent;
(2) heating the admixture from ambient up to 180° C. while azeotropically removing water until the production of the waters of reaction ceases; and
(3) neutralize the catalyst and isolate the products.

9. The composition of matter according to claim 8 wherein the monoalkylated phenol is selected from the group consisting of m-cresol, o-cresol, p-cresol, 2-t-butylphenol, p-isopropylphenol, o-sec-butylphenol, p-t-butylphenol, p-dodecylphenol and p-nonylphenol.

10. The composition of matter according to claim 8 wherein the 2,4-dialkylated phenol is selected from 2,4-dimethylphenol and 2,4-dinonylphenol.

11. The composition of matter according to claim 8 wherein the primary mercaptan is selected from n-dodecylmercaptan, n-octylmercaptan and n-butylmercaptan.

12. The composition of matter according to claim 8 wherein the mole ratio of phenolic to formaldehyde to mercaptan is 1:1.25:1.

13. The composition of matter according to claim 8 wherein the azeotroping solvent is selected from toluene, xylene or benzene.

14. An antioxidant for the protection of organic materials, said antidegradant being a mixture of reaction products derived from the process comprising:
(1) admixing one mole of an alkylated phenol selected from the group consisting of: p-cresol, m-cresol, o-cresol, 2,4-dimethylphenol, 2-t-butyl-p-cresol, p-ethylphenol, 3-ethylphenol, p-monononylphenol, p-isopropylphenol, p-sec-butylphenol, o-sec-butylphenol, p-t-butylphenol, 3-t-butylphenol, p-t-octylphenol, 2,4-dinonylphenol, and dodecyl phenol; with
(a) from 0.5 to 1.5 moles of a primary mercaptan of 6 to 14 carbon atoms; and
(b) from 0.5 to 2.25 moles of aqueous formaldehyde; and
(c) from 0.1 to 10 percent by weight based on the weight of the alkylated phenol of an acid selected from the group consisting of: toluene sulfonic acid, methanesulfonic acid, xylenesulfonic acid, sulfuric acid, glacial acetic acid, boron trifluoride, and Amberlyst 15;
(d) an adequate amount of a solvent that will azeotrope with water;
(2) heating the admixture from ambient to 150° C. while azeotropically removing water until the production of the waters of reaction ceases;
(3) neutralization of the acid and isolation of the reaction product mixture.

15. An antioxidant according to claim 14 wherein the alkylated phenol is n-dodecylphenol; the mercaptan is n-dodecylmercaptan; the acid catalyst is toluenesulfonic acid or xylenesulfonic acid; the solvent is toluene and the mole ratio of phenol to formaldehyde to mercaptan is 1:1.25:1.

16. An antioxidant according to claim 14 wherein the organic material is natural rubber and sunthetic rubbers.

17. An antioxidant according to claim 14 wherein the organic material is SBR, polybutadiene or nitrile rubber.

* * * * *